United States Patent
Comino et al.

(10) Patent No.: US 8,198,372 B2
(45) Date of Patent: Jun. 12, 2012

(54) VULCANISABLE FLUOROELASTOMERIC COMPOSITIONS

(75) Inventors: Giovanni Comino, Monza (IT); Claudia Manzoni, Bologna (IT); Milena Stanga, Origgio (IT); Margherita Albano, Milan (IT)

(73) Assignee: Solvay Solexis S.p.A., Bollate (MI) (IT)

( * ) Notice: Subject to any disclaimer, the term of this patent is extended or adjusted under 35 U.S.C. 154(b) by 0 days.

(21) Appl. No.: 12/743,204

(22) PCT Filed: Nov. 20, 2008

(86) PCT No.: PCT/EP2008/065922
§ 371 (c)(1),
(2), (4) Date: Jul. 22, 2010

(87) PCT Pub. No.: WO2009/065895
PCT Pub. Date: May 28, 2009

(65) Prior Publication Data
US 2010/0311909 A1    Dec. 9, 2010

(30) Foreign Application Priority Data
Nov. 22, 2007   (EP) ..................................... 07425740

(51) Int. Cl.
C08L 27/12          (2006.01)
(52) U.S. Cl. ...................................................... 525/199
(58) Field of Classification Search .................. 525/199
See application file for complete search history.

(56) References Cited

U.S. PATENT DOCUMENTS

| | | | |
|---|---|---|---|
| 3,752,787 A | 8/1973 | De Brunner | |
| 3,876,654 A | 4/1975 | Pattison | |
| 4,035,565 A | 7/1977 | Apotheker et al. | |
| 4,233,427 A | 11/1980 | Bargain et al. | |
| 4,243,770 A | 1/1981 | Tatemoto et al. | |
| 4,259,463 A | 3/1981 | Moggi et al. | |
| 4,564,662 A | 1/1986 | Albin | |
| 4,694,045 A | 9/1987 | Moore | |
| 4,745,165 A | 5/1988 | Arcella et al. | |
| 4,789,717 A | 12/1988 | Giannetti et al. | |
| 4,864,006 A | 9/1989 | Giannetti et al. | |
| 4,943,622 A | 7/1990 | Naraki et al. | |
| 5,173,553 A | 12/1992 | Albano et al. | |
| 5,523,346 A | 6/1996 | Wu | |
| 5,616,648 A | 4/1997 | Wu | |
| 6,310,141 B1 | 10/2001 | Chen et al. | |
| 6,395,834 B1 * | 5/2002 | Albano et al. | ................ 525/199 |
| 7,022,773 B2 * | 4/2006 | Albano et al. | ................ 525/199 |
| 2006/0189760 A1 * | 8/2006 | Albano et al. | ................ 525/199 |

FOREIGN PATENT DOCUMENTS

| | | |
|---|---|---|
| EP | 136596 A2 | 4/1985 |
| EP | 199138 A2 | 10/1986 |
| EP | 335705 A1 | 10/1989 |
| EP | 410351 A1 | 1/1991 |
| EP | 684277 A1 | 11/1995 |
| EP | 769520 A1 | 4/1997 |
| EP | 860436 A1 | 8/1998 |
| EP | 969 027 A1 | 1/2000 |
| EP | 979 832 A1 | 2/2000 |
| EP | 1031606 A1 | 8/2000 |
| EP | 1260550 A1 | 11/2002 |
| EP | 1262497 A2 | 12/2002 |
| EP | 1262517 A1 | 12/2002 |
| EP | 1304341 A2 | 4/2003 |
| EP | 1621557 A2 | 2/2006 |
| WO | WO 97/05122 A1 | 2/1997 |

OTHER PUBLICATIONS

Standard ASTM D2230-96 (reapproved 2002), "Standard Test Method for Rubber property—Extrudability of unvulcanized compounds", 2007, p. 1-4.
Standard ASTM D3418-03, "Standard Test Method for Transition Temperatures of Polymers by Differential Scanning Calorimetry", 2003 p. 1-7; 8 pgs.
Standard ASTM D1646-07, "Standard Test Methods for Rubber—Viscosity, Stress relaxation and Pre-vulcanization characteristics (Mooney Viscometer)", 2007, p. 1-12; 13 pgs.
Standard ISO/TS 13762, 20010315, "Technical Specification—Particle size analysis—Small angle X-ray scattering method", Mar. 15, 2001, p. 1-22; 30 pgs.

* cited by examiner

*Primary Examiner* — Nathan M Nutter
(74) *Attorney, Agent, or Firm* — Arent Fox LLP

(57) ABSTRACT

Vulcanizable fluoroelastomer compositions comprising:
A) a fluoroelastomer matrix based on vinylidene fluoride (VDF) with a Mooney viscosity (1+10) at 121° C. of less than 35 MU (Mooney Units) measured according to ASTM standard D 1646; and
B) a semi-crystalline fluoropolymer, in an amount of from 20% to 70% by weight relative to the total weight of A)+B), the semi-crystalline fluoropolymer being constituted of tetrafluoroethylene (TFE) homopolymers and copolymers of TFE with one or more monomers containing at least one unsaturation of ethylenic type, in an amount of from 0.01 to 10 mol %, said semi-crystalline fluoropolymer having a mean particle size between 10 and 400 nm.

12 Claims, No Drawings

VULCANISABLE FLUOROELASTOMERIC COMPOSITIONS

CROSS-REFERENCE TO RELATED APPLICATIONS

This application is a U.S. national stage application under 35 U.S.C. §371 of International Application No. PCT/EP2008/065922 filed Nov. 20, 2008, which claims priority to European Patent Application No. 07425740.3 filed Nov. 22, 2007, these applications being incorporated herein by reference in their entirety for all purposes.

FIELD OF THE INVENTION

The invention relates to fluoroelastomer compositions comprising a fluoroelastomer matrix based on vinylidene fluoride (VDF) and a semi-crystalline fluoropolymer based on tetrafluoroethylene (TFE), these compositions being particularly suitable for conversion by extrusion, to a process for manufacturing them, and to articles manufactured from these compositions.

BACKGROUND OF THE INVENTION

VDF-based fluoroelastomers are one of the classes of fluorocarbon elastomers mainly available on the market. By virtue of their excellent heat-resistance and chemical-resistance characteristics, these polymers are generally used in the production of compounds intended for the manufacture of technical articles such as sealing parts, pipes, oil seals and O-rings in which the leaktightness and the resistance to substances such as mineral oils, hydraulic fluids, combustibles, aliphatic, chlorinated and aromatic hydrocarbons and solvents or chemical agents of diverse nature must be absolutely ensured, for their use in sectors such as the electronics, aeronautic, nuclear, military, automotive, nautical and energy industries.

Given the specific applications and the particular forms of the products, the conversion techniques applied to fluoroelastomers based on vinylidene fluoride (VDF) have mostly relied on compression-moulding or injection-moulding techniques.

However, the increasing use, in particular in the automotive industry, of profiles and tubes based on such materials has recently encouraged the development of extrusion-based techniques for converting them. To convert VDF-based fluoroelastomers via this technology, it is essential for the material to be able to be extruded at high velocity, in order to ensure high production efficiency, and for the extruded product to have low die-swell, so as to maintain the desired size and optimum surface qualities, without defects (absence of shark skin). Needless to say, the intrinsic mechanical properties of the VDF-based fluoroelastomer must also be conserved.

It is known in the prior art that the use of processing aids, for example plasticizers such as sebacates, esters and alcohols derived from fatty acids, or hydrogenated polymers such as low molecular weight polyethylene or organic silicones, makes it possible in the extrusion of VDF-based fluoroelastomers to improve the rate of extrusion of the blend and the surface quality of the extrudate. However, such additives have the drawback of degrading the mechanical properties.

It is also known practice in the prior art to use fluoropolymer fillers in VDF-based fluoroelastomer matrices to improve the mechanical properties and the leaktightness of the products. Documents EP 1 262 517, EP 1 260 550 and EP 1 262 497 disclose fluoroelastomer compositions in which disperse TFE-based fluoropolymer fillers are incorporated into a VDF-based fluoroelastomer matrix with a high Mooney viscosity (between 49 and 52 MU), for the manufacture of O-rings and other products.

Also, document U.S. Pat. No. 6,310,141 discloses fluoroelastomer compositions comprising a VDF-based fluoroelastomer matrix and a fluoropolymer of THV type (tetrafluoroethylene (TFE), hexafluoropropylene (HFP), vinylidene fluoride (VDF)) comprising small amounts of TFE-based repeating units in the chain. However, these THV fluoropolymers do not make it possible to obtain an improvement in the extrudability of the elastomer (die swell, surface qualities), e.g. a shear rate of about 100 $sec^{-1}$, typical of extrusion processes.

The fluoroelastomer compositions of the prior art are not suitable for conversion by extrusion, since they cannot be processed at high speed and give rise to pronounced die swell of the extrudate and/or defects in the surface quality.

SUMMARY OF THE INVENTION

There was therefore felt to be a need for fluoroelastomer compositions for extrusion having the following combination of properties:
- higher speed in extrusion, i.e. higher production efficiency,
- improved die swell in extrusion, i.e. reduced die swell value,
- extrudate free of surface defects, in particular shark skin, as evaluated according to ASTM standard D 2230-96 (2002) rating system B, the abovementioned properties being obtained while maintaining optimum mechanical properties.

One subject of the present invention is thus vulcanizable fluoroelastomer compositions comprising:
A) a fluoroelastomer matrix based on vinylidene fluoride (VDF) with a Mooney viscosity (1+10) at 121° C. of less than 35 MU (Mooney Units), preferably less than 25 MU and more preferably less than 20 MU, measured according to ASTM standard D 1646;
B) a semi-crystalline fluoropolymer, in an amount of from 20% to 70% by weight relative to the total weight of A)+B), preferably from 25% to 60% by weight and more preferably from 35% to 55% by weight, the semi-crystalline fluoropolymer being chosen from tetrafluoroethylene (TFE) homopolymers and copolymers of TFE with one or more monomers containing at least one unsaturation of ethylenic type, in an amount of from 0.01 to 10 mol % and preferably from 0.05 to 7 mol %, said semi-crystalline fluoropolymer having a mean particle size between 10 and 400 nm.

DETAILED DESCRIPTION

The Applicant has found, surprisingly and unexpectedly, that, by virtue of the selection of the VDF-based fluoroelastomer matrix having the Mooney viscosity described above and of the suitable choice of semi-crystalline fluoropolymer mentioned above, it is possible to obtain the combination of properties mentioned above, i.e. excellent behaviour during processing by extrusion, combined with noteworthy mechanical properties.

The vulcanizable fluoroelastomer compositions may be obtained by mixing the semi-crystalline fluoropolymer B) with the fluoroelastomer matrix A) or the fluoroelastomer A). Preferably, the fluoroelastomer compositions of the invention may be obtained by mixing a latex of semi-crystalline fluoropolymer B) with a latex of fluoroelastomer A), followed by coagulation. Alternatively, the fluoroelastomer compositions may be obtained via a process in which, in the first step, the semi-crystalline fluoropolymer B) is polymerized, in order advantageously to obtain a latex of the polymer B), followed by polymerizing the fluoroelastomer A) in the presence of the said latex of polymer B), the coagulation generally being performed in the final stage. In this way, the fluoroelastomer A) covers the particles of semi-crystalline fluoropolymer B). In this case, the fluoroelastomer composition advantageously has a core/shell form in which the fluoropolymer B) constitutes the core, while the fluoroelastomer A) forms the shell.

The fluoroelastomers used in the fluoroelastomer matrix A) of the present invention are advantageously VDF-based copolymers, in which VDF is copolymerized with at least one comonomer chosen from the following:

$C_2$-$C_8$ perfluoroolefins, such as tetrafluoroethylene (TFE), hexafluoropropene (HFP) or hexafluoroisobutene;

$C_2$-$C_8$ chloro- and/or bromo- and/or iodo-fluoroolefins, such as chlorotrifluoroethylene (CTFE);

(per)fluoroalkyl vinyl ethers (hereinbelow: PAVE) $CF_2$=$CFOR_f$, in which $R_f$ is a $C_1$-$C_6$ (per)fluoroalkyl, for example $CF_3$, $C_2F_5$ or $C_3F_7$;

(per)fluorooxyalkyl vinyl ethers $CF_2$=CFOX, in which X is: a $C_1$-$C_{12}$ ((per)fluoro)oxyalkyl containing one or more ether groups, for example perfluoro-2-propoxypropyl;

(per)fluorodioxoles of formula:

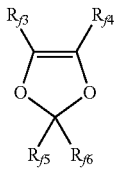

in which each of the groups $R_{f3}$, $R_{f4}$, $R_{f5}$ and $R_{f6}$, which may be identical or different, is independently a fluorine atom or a $C_1$-$C_6$ perfluoroalkyl group optionally comprising one or more oxygen atoms, for example —$CF_3$, —$C_2F_5$, —$C_3F_7$, —$OCF_3$ or —$OCF_2CF_2OCF_3$, preferably perfluorodioxoles;

(per)fluoromethoxyvinyl ethers (hereinbelow: MOVE) having the general formula:

$$CFX_2=CX_2OCF_2OR''_f \qquad \text{(I-Ba)}$$

in which $R''_f$ is chosen from linear or branched $C_1$-$C_6$ (per)fluoroalkyls; cyclic $C_5$-$C_6$ (per)fluoroalkyls; and linear or branched $C_2$-$C_6$ (per)fluorooxyalkyls, containing from one to three oxygen atoms, and $X_2$=F or H; preferably, $X_2$ is F and $R''_f$ is —$CF_2CF_3$ (MOVE1), $CF_2CF_2OCF_3$ (MOVE2); or —$CF_3$ (MOVE3);

non-fluorinated $C_2$-$C_8$ olefins (Ol), for example ethylene and propylene.

Preferred compositions (in molar percentages) of the fluoroelastomer A) are the following, 100% being the sum of the molar percentages of the monomers:

(a) vinylidene fluoride (VDF) 35-85%, hexafluoropropylene (HFP) 10-45%, tetrafluoroethylene (TFE) 0-30%, perfluoroalkyl vinyl ether (PAVE) 0-15%, (b) vinylidene fluoride (VDF) 50-80%, perfluoroalkyl vinyl ether (PAVE) 5-50%, tetrafluoroethylene (TFE) 0-30%;

(c) vinylidene fluoride (VDF) 20-30%, non-fluorinated $C_2$-$C_8$ olefins (Ol) 10-30%, hexafluoropropylene (HFP) and/or perfluoroalkyl vinyl ether (PAVE) 18-27%, tetrafluoroethylene (TFE) 10-30%, (d) tetrafluoroethylene (TFE) 33-75%, perfluoroalkyl vinyl ether (PAVE) 15-45%, vinylidene fluoride (VDF) 5-30%, hexafluoropropylene (HFP) 0-30%, (e) vinylidene fluoride (VDF) 35-85%, (per)fluoromethoxyvinyl ether (MOVE) 5-40%, perfluoroalkyl vinyl ether (PAVE) 0-30%, tetrafluoroethylene (TFE) 0-40%, hexafluoropropylene (HFP) 0-30%.

Optionally, the fluoroelastomer matrix also comprises monomer units derived from a bis-olefin having the general formula:

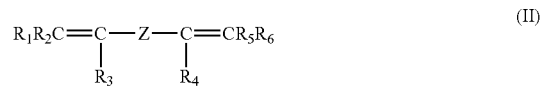

(II)

in which:

$R_1$, $R_2$, $R_3$, $R_4$, $R_5$ and $R_6$, which may be identical or different, are H or $C_1$-$C_5$ alkyls;

Z is a linear or branched $C_1$-$C_{18}$ alkylene or cycloalkylene radical optionally containing oxygen atoms, preferably at least partially fluorinated, or a (per)fluoropolyoxyalkylene radical, as described, for example, in patent EP 661 304 in the name of the Applicant.

In the chain of the fluoroelastomer A), the amount of units derived from such bis-olefins is generally between 0.01 mol % and 1.0 mol %, preferably between 0.03 mol % and 0.5 mol % and even more preferably between 0.05 mol % and 0.2 mol % per 100 mol of the other monomer units indicated above that constitute the base structure of the fluoroelastomer.

The process for preparing the fluoroelastomer A) may be performed by polymerizing the monomers in aqueous emulsion in the presence of radical initiators. The polymerization is performed at temperatures of between 25 and 90° C. and more preferably between 50 and 85° C. The pressure at which the process is performed is between 0.5 and 7 MPa and more preferably between 1 and 5 MPa. Preferably, the fluoroelastomer A) is prepared in a microemulsion of (per)fluoropolyoxyalkylenes. See, for example, patents U.S. Pat. No. 4,789,717 and U.S. Pat. No. 4,864,006, which are incorporated in their entirety by reference.

Examples of radical initiators are alkali metal or ammonium persulfates, perphosphates, perborates or percarbonates, optionally in combination with ferrous, cuprous or silver salts, or salts of other readily oxidizable metals. Surfactants of various types are also usually present in the reaction medium, among which fluorinated surfactants are particularly preferred.

In the preparation of the fluoroelastomers of the present invention, it is possible to use chain-transfer agents and/or to increase the amount of polymerization initiator to obtain the indicated Mooney viscosity. A person skilled in the art is capable of readily determining the amount of transfer agent or of initiator as a function of the fluoroelastomer composition A) that it is desired to use.

The term "semi-crystalline fluoropolymer B)" means a fluoropolymer that has, besides the glass transition temperature Tg, at least one crystalline melting point on DSC analysis.

In other words, the semi-crystalline fluoropolymer B) generally has a heat of fusion, measured according to ASTM standard D 3418, of at least 5 J/g, preferably of at least 15 J/g and more preferably of at least 25 J/g.

The mean particle size of the semi-crystalline fluoropolymer B) is between about 10 and about 400 nm, preferably between about 40 and about 300 nm and more preferably between about 60 and about 250 nm.

The Applicant has surprisingly found that it is also essential that the mean particle size of the polymer (B) is of less than 400 nm.

The Applicant has found that when the mean particle size of the polymer (B) exceeds 400 nm, the addition of said polymer (B) particles in the composition does not provide for any synergistic effect for the improvement of mechanical properties in the fluoroelastomer matrix, even when said fluoroelastomer (A) fulfils the Mooney viscosity requirement of the invention (i.e. <35 MU).

The mean particle size of the semi-crystalline polymer B) can be advantageously measured according to ISO 13762, e.g. using an X-rays Microtrack particle analyzer by small angle X-ray scattering method.

Nevertheless, other analytical techniques can be used for the determination of the mean particle size of the semi-crystalline polymer B).

The preparation of the said semi-crystalline fluoropolymers B) is performed by polymerizing the monomers as an aqueous emulsion, or as a dispersion or microemulsion of perfluoropolyoxyalkylenes, as described in patents U.S. Pat. Nos. 4,789,717 and 4,864,006.

In particular, the aqueous microemulsion polymerization process is performed in the presence of perfluoropolyoxyalkylenes as described, for example, in European patent application EP 969 027 in the name of the Applicant. Microemulsion polymerization techniques in which the oil phase is constituted of polymerizable unsaturated monomers may also be used, as described in patents U.S. Pat. Nos. 5,523,346 and 5,616,648.

The semi-crystalline fluoropolymer B) is chosen from tetrafluoroethylene (TFE) homopolymers and copolymers of TFE with one or more monomers containing at least one unsaturation of ethylenic type, in an amount of from 0.01 mol % to 10 mol % and preferably from 0.05 mol % to 7 mol %.

The said ethylenically unsaturated monomers may be of hydrogenated type or of fluorinated type. Among the hydrogenated monomers that may be mentioned are ethylene, propylene, acrylic monomers, for example methyl methacrylate, (meth)acrylic acid, butyl acrylate and hydroxyethylhexyl acrylate, and styrene monomers.

Among the fluorinated ethylenically unsaturated monomers that may be mentioned are those listed above as comonomers for the preparation of the fluoroelastomer A) in combination with VDF, and the following:

$C_2$-$C_8$ hydrogenated fluoroolefins, such as vinyl fluoride (VF), vinylidene fluoride (VDF), trifluoroethylene (TrFE) and perfluoroalkylethylene $CH_2=CH-R_f$, in which $R_f$ is a $C_1$-$C_6$ perfluoroalkyl.

The preferred fluorinated monomers are the PAVEs, in particular perfluoromethyl, perfluoroethyl and perfluoropropyl vinyl ether, and the (per)fluorodioxoles as defined above, in particular perfluorodioxoles.

The semi-crystalline fluoropolymer B) may be partially fluorinated (i.e. it may comprise repeating units containing hydrogen) or perfluorinated (absence of repeating units containing hydrogen). Perfluorinated semi-crystalline fluoropolymers (perfluoropolymers) are generally preferred.

Optionally, the semi-crystalline fluoropolymer is covered with a shell of a semi-crystalline fluoropolymer containing bromine and/or iodine atoms in the chain, derived from brominated and/or iodinated comonomers, in an amount of from 0.1 mol % to 10 mol % relative to the total number of moles of base monomer units in the core+shell semi-crystalline fluoropolymer, the semi-crystalline fluoropolymer in the core and in the shell possibly being of diverse composition, as described in patent EP 1 031 606.

A further subject of the invention is vulcanizable fluoroelastomer compositions. In general, the fluoroelastomer composition mixed with vulcanizing agents constitutes what is commonly referred to as the compound. The compound may also contain vulcanizing coagents and conventional ingredients used for preparing vulcanization compounds. Among these ingredients are fillers, charges, pigments, antioxidants, stabilizers, etc. as described in detail hereinbelow.

The compositions of the present invention may undergo peroxide or ionic vulcanization or a combination of the two techniques (mixed vulcanization). When crosslinking is performed via peroxide or mixed vulcanization, the fluoroelastomers A) contain iodine and/or bromine atoms in the chain and/or at the end of the macromolecules. Introduction into the fluoroelastomer matrix of such iodine and/or bromine atoms may be performed via addition of brominated and/or iodinated "cure-site" comonomers, such as bromo- and/or iodo-olefins containing from 2 to 10 carbon atoms, as described, for example, in U.S. Pat. Nos. 4,035,565 and 4,694,045, or alternatively iodo- and/or bromo-fluoroalkyl vinyl ethers, as described in patents U.S. Pat. Nos. 4,745,165, 4,564,662 and EP 199 138, in amounts such that the content of cure-site comonomers in the final product is generally between 0.05 and 4 mol per 100 mol of the other base monomer units.

Other iodinated compounds that may be used are triiodinated triazine derivatives, as described in European patent application EP 860 436 and in European patent application EP 979 832.

Alternatively or in combination with the cure-site comonomers, it is possible to introduce end iodine and/or bromine atoms into the fluoroelastomer A) via addition to the reaction mixture of iodinated and/or brominated chain-transfer agents, for instance compounds of formula $R_f(I)_x(Br)_y$, in which $R_f$ is a (per)fluoroalkyl or a (per)fluorochloroalkyl containing from 1 to 8 carbon atoms, while x and y are integers between 0 and 2, with $1 \leq x+y \leq 2$ (see, for example, patents U.S. Pat. Nos. 4,243,770 and 4,943,622). It is also possible to use as chain-transfer agents alkali metal or alkaline-earth metal iodides and/or bromides, as described in patent U.S. Pat. No. 5,173,553.

In combination with the chain-transfer agents containing iodine and/or bromine, it is possible to use other chain-transfer agents known in the art, such as ethyl acetate, diethyl malonate, etc.

Peroxide vulcanization is performed, according to known techniques, by addition of a suitable peroxide capable of generating radicals by thermal decomposition. Among the agents most commonly used, mention may be made of the following: dialkyl peroxides, for instance di-tert-butyl peroxide and 2,5-dimethyl-2,5-di(tert-butylperoxy)hexane; dicumyl peroxide; dibenzoyl peroxide; di-tert-butyl perbenzoate; bis[1,3-dimethyl-3-(tert-butylperoxy)butyl]carbonate. Other peroxide systems are described, for example, in patent applications EP 136 596 and EP 410 351.

Other products are then added to the vulcanization compound, such as:
(a) vulcanization coagents, in an amount generally of between 0.5% and 10% and preferably between 1% and 7% by weight relative to the polymer; among these coagents, the ones commonly used are: triallyl cyanurate; triallyl isocyanurate (TAIC); tris(diallylamine)-s-triazine; triallyl phosphite; N,N-diallylacrylamide; N,N,N',N'- tetraallylmalonamide; trivinyl isocyanurate; 2,4,6-trivinylmethyltrisiloxane, etc.; TAIC is particularly preferred;

other preferred crosslinking agents are bis-olefins described in European patent EP 769 520.

Other crosslinking agents that may be used are triazines described in patent application EP 860 436 and in patent WO 97/05122;

(b) optionally, a metal compound, in an amount of between 1% and 15% and preferably between 2% and 10% by weight relative to the polymer, chosen from oxides or hydroxides of divalent metals, for instance Mg, Zn or Ca, optionally combined with a salt of a mild acid, for instance Na, K or Ca stearate, benzoate, carbonate, oxalate or phosphite;

(c) other conventional additives, such as thickening fillers, pigments, antioxidants, stabilizers and the like.

Ionic vulcanization is performed by addition of vulcanizing agents and accelerators that are well known in the art. The amounts of accelerators are between 0.05-5 phr, and the vulcanizing agent between 0.5-15 phr and preferably 1-6 phr.

As vulcanizing agents that may be used, mention may be made of aromatic or aliphatic polyhydroxylated compounds, or derivatives thereof, as described, for example, in EP 335 705 and U.S. Pat. No. 4,233,427. Among these, mention is made in particular of: bisphenols, in which the two aromatic rings are joined together via an aliphatic, cycloaliphatic or aromatic divalent radical, or via an oxygen atom, or alternatively a carbonyl group. Bisphenol AF is particularly preferred.

Examples of accelerators that may be used include: quaternary ammonium or phosphonium salts (see, for example, EP 335 705 and U.S. Pat. No. 3,876,654); aminophosphonium salts (see, for example, U.S. Pat. No. 4,259,463); phosphoranes (see, for example, U.S. Pat. No. 3,752,787). Quaternary phosphonium salts and aminophosphonium salts are preferred.

Instead of using the accelerator and the vulcanizing agent separately, it is also possible to use an adduct between an accelerator and a vulcanizing agent in a mole ratio of from 1:2 to 1:5 and preferably from 1:3 to 1:5, the accelerator being one of the organic onium compounds bearing a positive charge, as defined above, the vulcanizing agent being chosen from the compounds indicated above, in particular di- or polyhydroxylic compounds; the adduct being obtained by melting the product of reaction between the accelerator and the vulcanizing agent in the mole ratios indicated, or by melting the 1:1 mixture of the adduct supplemented with the vulcanizing agent in the amounts indicated. An excess of the accelerator relative to that contained in the adduct may also optionally be present.

For the preparation of the adduct, cations that are particularly preferred are: 1,1-diphenyl-1-benzyl-N-diethylphosphoranamine and tetrabutylphosphonium; among the anions that are particularly preferred are bisphenol compounds in which the two aromatic rings are bonded to a divalent radical chosen from perfluoroalkyl groups containing from 3 to 7 carbon atoms, and the OHs are in the para position.

The preparation of the adduct is described in European patent application EP 684 277 in the name of the Applicant, which is incorporated herein in its entirety by reference.

The vulcanizing compound may also contain:

i) one or more inorganic-acid acceptors chosen from those known in the ionic vulcanization of vinylidene fluoride copolymers, in amounts of 1-40 parts per 100 parts of fluoroelastomer copolymer;

ii) one or more basic compounds chosen from those known in the ionic vulcanization of vinylidene fluoride copolymers, in an amount of from 0.5 to 10 parts per 100 parts of fluoroelastomer copolymer.

The basic compounds mentioned in point ii) are commonly chosen from the group constituted by $Ca(OH)_2$, metal salts of mild acids, for instance Ca, Na and K carbonates, benzoates, oxalates and phosphites and mixtures of the above-mentioned hydroxides with the abovementioned metal salts; among these compounds of type i), mention may be made of MgO.

Other conventional additives may then be added to the vulcanization compound, such as thickeners, pigments, antioxidants, stabilizers and the like.

Vulcanizable products, which are vulcanized using ionic, peroxide and/or mixed vulcanization, may be obtained from the vulcanizable compositions of the invention after extrusion.

With the compositions of the invention, it is possible to produce via coextrusion composite products with other elastomers, which may or may not be fluorinated, or with other fluorinated or non-fluorinated polymers. In particular, the coextrusion may take place between one or more of the fluoroelastomer compositions of the invention and one or more fluorinated or non-fluorinated elastomers and/or one or more fluorinated or non-fluorinated thermoplastic polymers. Examples of preferred elastomers are NBR rubbers (nitrile/butadiene rubbers), ACM rubbers (acrylic rubbers), epichlorohydrin (ECO), etc. Examples of polymers that may be mentioned are Kevlar, PVC, THV, PVDF, etc.

The compositions of the invention are particularly suitable for producing co-extrudates or multilayer structures since these compounds may be extruded to give extrudates whose surfaces are free of defects. This characteristic is desired by processors who use fluoroelastomer compositions.

The vulcanization of the products obtained by coextrusion as described above is performed as indicated for the vulcanizable compositions of the present invention.

Further subjects of the present invention are the vulcanized products that may be obtained as indicated above.

The compositions of the invention are particularly suitable for producing extruded articles such as fuel pipes. In addition, the compositions of the invention are particularly suitable for producing via extrusion products even having a complex geometry, for instance products known as filler neck hoses.

If so desired, the compositions of the invention may also be used for preparing products that cannot be obtained by extrusion, i.e. by using other processing techniques. Examples of such products are shaft seals, gaskets, diaphragms and sealing parts for valves for chemical or petrochemical plants or for the automotive industry.

The examples that follow are given as non-limiting illustrations of the subject of the present invention.

EXAMPLES

Methods

Determination of the Mooney Viscosity $(1+10)^{121°\,C.}$

The determination is performed according to ASTM method D 1646.

Extrusion Processability Tests

The tests are performed according to ASTM method D2230 (Garvey test). The temperature of the extruder head is 115° C. The temperature of the body is 100° C.

Mechanical Properties

The mechanical properties are determined according to ASTM standard D412C.

Example 1

Preparation of the Fluoroelastomer Composition According to the Invention Containing 40% Semi-Crystalline Fluoropolymer B)

a) Preparation of the Semi-Crystalline Fluoropolymer B)

6.5 litres of demineralized water and 260 ml of a perfluoropolyoxyalkylene microemulsion obtained beforehand by mixing 56.4 ml of a perfluoropolyoxyalkylene containing acid end groups of formula: $CF_2ClO(CF_2—CF(CF_3)O)_n(CF_2O)_mCF_2COOH$, in which n/m=10, with an average molecular weight of 600; 56.4 ml of aqueous 30 vol % $NH_4OH$ solution; 112.8 ml of demineralized water; 34.4 ml of Galden® D02 of formula: $CF_3O(CF_2—CF(CF_3)O)_n(CF_2O)_mCF_3$ in which n/m=20, with an average molecular weight of 450, were introduced, after evacuation, into a 10-litre autoclave equipped with a stirrer operating at 545 rpm.

The autoclave was then brought to 80° C. and maintained at this temperature throughout the reaction. The autoclave was brought to a pressure of 0.6 bar (0.06 MPa) with ethane and then to a pressure of 20 bar (2 MPa) with a monomer mixture constituted of 6.5 mol % of perfluoromethyl vinyl ether (PMVE) and 93.5 mol % of tetrafluoroethylene (TFE).

0.13 g of ammonium persulfate (APS) were then introduced into the autoclave as initiator.

During the reaction, the pressure was maintained at 20 bar by continuously feeding in the following monomer mixture: 2 mol % of PMVE and 98% of TFE. After reaction for 160 minutes, corresponding to 100% conversion of the monomers, the autoclave was cooled and the latex discharged.

b) Preparation of the Latex of the Fluoroelastomer A)

14 litres of demineralized water were introduced, after evacuation, into a 22-litre autoclave equipped with a stirrer operating at 460 rpm. The autoclave was then brought to 85° C. and maintained at this temperature throughout the reaction. A monomer mixture having the following composition (in moles): VDF: 34%; HFP: 54%; TFE: 12%, was then fed in so as to bring the pressure to 15 bar (1.5 MPa).

56 g of ammonium persulfate (APS) as initiator and 34.8 ml of ethylacetate were then introduced into the autoclave. The pressure of 15 bar was kept constant throughout the polymerization by feeding in a mixture constituted of (in moles): VDF: 60%; HFP: 20%; TFE: 20%.

After reaction for 95 minutes, corresponding to 100% conversion of the monomers, the autoclave was cooled and the latex discharged. The fluoroelastomer obtained had a Mooney viscosity of 10 MU.

c) Mixing of the Latices and Preparation of the Composition of the Invention

The latex obtained in a) was mixed with the latex prepared in b) so as to obtain an amount of semi-crystalline polymer equal to 40% by weight relative to the total weight of A)+B). After mixing, the latex was coagulated with an aluminium sulfate solution (6 g of $Al_2(SO_4)_3$ per litre of latex) and dried at 90° C. in a circulating-air oven for 16 hours. The properties of the composition are given in Table 1.

Example 2

Comparative

Preparation of a Composition Containing 40% Semi-Crystalline Fluoropolymer B)

a) Preparation of the Latex of the Semi-Crystalline Fluoropolymer B)

The latex of Example 1(a) was used.

b) Preparation of the Latex of the Fluoroelastomer A)

6.5 litres of demineralized water and 67 ml of the perfluoropolyoxyalkylene microemulsion having the composition described in Example 1(a) were introduced, after evacuation, into a 10-litre autoclave equipped with a stirrer operating at 545 rpm.

The autoclave was then brought to 80° C. and maintained at this temperature throughout the reaction. A monomer mixture having the following composition (in moles): VDF: 48%; HFP: 45%; TFE: 7%, was then fed in so as to bring the pressure to 30 bar (3 MPa).

The following were then introduced into the autoclave:

0.32 g of ammonium persulfate (APS) as initiator;

21 g of 1,4-diiodoperfluorobutane ($C_4F_8I_2$) as chain-transfer agent; the addition was performed in 3 portions, the first equal to 3.2 g at the start of the polymerization, the second equal to 9.4 g after 20% conversion, and the third equal to 8.4 g at 80% conversion;

10 g of bis-olefin of formula $CH_2=CH—(CF_2)_6—CH=CH_2$; the addition was performed in 20 portions, each of 0.5 g, from the start of polymerization and at every 5% increment in the conversion of the monomers;

the pressure of 30 bar was kept constant throughout the polymerization by feeding in a mixture constituted of (in moles): VDF: 70%; HFP: 19%; TFE: 11%.

After reaction for 160 minutes, corresponding to 100% conversion of the monomers, the autoclave was cooled and the latex discharged. The fluoroelastomer obtained had a Mooney viscosity of 47 MU.

c) Mixing of the Latices and Preparation of the Composition

The latex obtained in a) was mixed with the latex prepared in b) so as to obtain an amount of semi-crystalline polymer equal to 40% by weight relative to the total weight of A)+B). After mixing, the latex was coagulated with an aluminium sulfate solution (6 g of $Al_2(SO_4)_3$ per litre of latex) and dried at 90° C. in an air-circulating oven for 16 hours. The properties of the composition are given in Table 1.

Example 3

Preparation of the Composition of the Invention Containing 40% Semi-Crystalline Fluoropolymer B)

a) Preparation of the Latex of the Semi-Crystalline Fluoropolymer B)

The latex of Example 1(a) was used.

b) Preparation of the Latex of the Fluoroelastomer A)

The fluoroelastomer was prepared by following the same procedure as in Example 2(b) (comparative), except that:

the monomer mixture initially fed in to bring the pressure to 30 bar had the following composition (in moles): VDF: 17%; HFP: 70%; TFE: 13%;

25 g of $C_4F_8I_2$ were fed in (3 g at the start; 9 g after 20% conversion; 8 g after 80% conversion);

the pressure was kept constant at 30 bar by feeding in a mixture having the following composition (in moles): VDF: 50%; HFP: 25%; TFE: 25%.

The polymer obtained after reaction for 180 minutes had a Mooney viscosity of 22 MU.

c) Mixing of the Latices and Preparation of the Composition of the Invention

The procedure described in Example 1 was repeated.

The characterization of the composition of the invention is given in Table 1.

Example 4

Preparation of the Composition of the Invention Containing 40% Semi-Crystalline Fluoropolymer B)

a) Preparation of the Latex of the Semi-Crystalline Fluoropolymer B)

A Hyflon® MFA 1041 latex produced by Solvay Solexis, containing a TFE/perfluoromethyl vinyl ether polymer, was used.

b) Preparation of the Latex of the Fluoroelastomer A)

A procedure similar to that used in Example 3(b) was followed, but using:
- 60 ml of microemulsion as in Example 3, but comprising 22 ml of $NH_4OH$;
- a reaction temperature of 85° C. with an initial feed up to 20 bar (2 MPa) having the following composition (in moles): VDF: 28%; HFP: 56%; TFE: 15%;
- 9 g of ammonium persulfate as initiator and 23.8 ml of ethyl acetate;
- a total pressure of 20 bar, kept constant for 52 minutes of reaction by feeding in a mixture having the following composition (in moles): VDF: 50%; HFP: 25%; TFE: 25%;

The fluoroelastomer obtained had a Mooney viscosity of 9 MU.

c) Mixing of the Latices and Preparation of the Composition of the Invention

The procedure described in Example 1 was repeated.

The characterization of the composition of the invention is given in Table 1.

Example 5

Preparation of a Composition Containing 30% Semi-Crystalline Fluoropolymer B)

a) Preparation of the Latex of the Semi-Crystalline Fluoropolymer B)

Example 1 is repeated.

b) Preparation of the Latex of the Fluoroelastomer A)

The procedure of Example 1 is repeated.

c) Mixing of the Latices and Preparation of the Final Composition

The latex obtained in a) was mixed with the latex obtained in b) so as to obtain an amount of semi-crystalline polymer equal to 30% by weight relative to the total weight of A)+B). The characterization of the composition of the invention is given in Table 1.

Example 6

Comparative

Preparation of a Composition Containing 30% Semi-Crystalline Fluoropolymer B)

a) Preparation of the Latex of the Semi-Crystalline Fluoropolymer B)

The latex of Example 1(a) was used.

b) Preparation of the Latex of the Fluoroelastomer A)

The procedure described in Example 3(b) was repeated, but only 20 g of $C_4F_8I_2$ were fed in (3 g at the start; 9 g after 20% conversion; 8 g after 80% conversion).

The fluoroelastomer obtained had a Mooney viscosity of 43 MU.

c) Mixing of the Latices and Preparation of the Composition

The procedure described in Example 1 was repeated, except that the latex obtained in a) was mixed so as to obtain an amount of semi-crystalline polymer equal to 30% by weight relative to the total weight of A)+B).

The characterization of the composition is given in Table 1.

Example 7

Preparation of a Composition Containing 40% Semi-Crystalline Fluoropolymer B)

a) Preparation of the Latex of the Semi-Crystalline Fluoropolymer B)

A Hyflon® PFA P450 latex containing a copolymer of TFE with propyl vinyl ether, produced by Solvay Solexis, is used.

b) Preparation of the Latex of the Fluoroelastomer A)

The latex of Example 4(b) was used.

c) Mixing of the Latices and Preparation of the Final Composition

The procedure of Example 1 was repeated.

The properties of the composition are given in Table 1.

Example 8

Comparative

Preparation of a Perfluoroelastomer Composition Containing 40% Semi-Crystalline Fluoropolymer B)

a) Preparation of the Latex of the Semi-Crystalline Fluoropolymer B)

The latex of Example 1(a) was used.

b) Preparation of the Latex of the Fluoroelastomer A)

The procedure described in Example 6 was repeated, but 65 ml of the microemulsion are fed in, the initial pressure is brought to 25 bar (2.5 MPa) with a mixture of perfluoromethyl vinyl ether (MVE) (65 mol %) and tetrafluoroethylene (TFE) (35 mol %), 22.6 g of $C_4F_8I_2$ are initially added, a constant pressure of 25 bar is maintained for 137 minutes of reaction, feeding in a mixture having the following composition (in moles): MVE: 40%; TFE: 60%. The polymer obtained has a Mooney viscosity of 9 MU.

c) Mixing of the Latices and Preparation of the Composition

The procedure described in Example 1 is repeated, except that the latex obtained in a) is mixed so as to obtain an amount of semi-crystalline polymer equal to 30% by weight relative to the total weight of A)+B).

Example 9

Comparative

Preparation of a Perfluoroelastomer Composition Containing 40% Semi-Crystalline Fluoropolymer B)

a) Preparation of the Latex of the Semi-Crystalline Fluoropolymer B)

The latex of Example 1(a) was coagulated to yield a solid particulate having an average size largely exceeding 400 nm (about 1 μm).

b) Preparation of the Latex of the Fluoroelastomer A)

The procedure described in Ex. 3(b) was repeated, but using:
- 65 ml of the microemulsion of ex. 3, but comprising 22 ml of NH4OH;
- a reaction temperature of 85° C., with initial feed up to 20 bar (2 MPa) having the following composition (in moles %): VDF: 28%; HFP: 56%; TFE: 15%;

9 g of ammonium persulfate and 23.8 ml of ethyl acetate; a total pressure of 20 bar, maintained during 52 minutes by feeding the following mixture (in moles %): VDF: 50%; HFP: 25%; TFE: 25%. The polymer obtained has a Mooney viscosity of 9 MU.

c) Mixing of the Fluoropolymer and Perfluoroelastomer and Preparation of the Composition Fluoroelastomer from step b) and semi-crystalline fluoropolymer from step a) were mixed in a open-mill so as to yield an amount of semi-crystalline polymer equal to 40% by weight relative to the total weight of A)+B).

In Table 1, the abbreviation FOR XA31 denotes the bisphenol AF/1,1-diphenyl-1-benzyl-N-diethylphosphoramine 3/1 adduct (mole ratio).

The mechanical properties were determined post-cure for 8 hours at 230° C. for the formulations comprising the compositions of Examples 1, 4, 5, 7, and 9 in which ionic vulcanization is performed.

For the formulations comprising the compositions of Examples 2, 3 and 6, in which peroxide vulcanization is performed, the mechanical properties are determined post-cure for 4 hours at 230° C.

The table shows that the compositions of the invention, besides having good mechanical properties, above all as regards the elongation at break, have optimum extrusion properties measured according to the Garvey test.

Comparative Examples 2 and 6, corresponding to compositions with VDF-based fluoroelastomers having Mooney viscosities equal to 47 and 43, respectively, give rise to extrudates whose properties are not satisfactory according to the Garvey test. Comparative Example 8 shows that the extrusion properties of perfluoroelastomer-based compositions (i.e. fluoropolymers not based on VDF) cannot be improved by adding the semi-crystalline fluoropolymer.

TABLE 1

| Composition | Ex. 1 | Ex. 2 Comp. | Ex. 3 | Ex. 4 | Ex. 5 | Ex. 6 Comp. | Ex. 7 | Ex. 8 Comp. | Ex. 9 Comp. |
|---|---|---|---|---|---|---|---|---|---|
| Composition A) + B) | 167 | 167 | 167 | 167 | 143 | 143 | 167 | 167 | 167 |
| FOR XA31 (phr) | 4 | — | — | 4 | 4 | — | 7 | — | 4 |
| MgO-DE (phr) | 3 | — | — | 3 | 3 | — | 4 | — | 3 |
| Ca(OH)$_2$ (phr) | 6 | — | — | 6 | 6 | — | 3 | — | 6 |
| N990MT carbon black (phr) | 1 | — | — | 1 | 1 | — | 6 | — | 1 |
| Drimix ® TAIC (phr) | — | 3 | 3 | — | — | 3 | 1 | 3 | — |
| Luperox ® 101XL 45 (phr) | — | 2 | 2 | — | — | 2 | — | 2 | — |
| ZnO (phr) | — | 5 | 5 | — | — | 5 | — | 5 | — |
| Mooney viscosity A) (MU) | 10 | 47 | 22 | 9 | 10 | 43 | 9 | 9 | 9 |
| Mean particle size B) (nm) | 40 | 40 | 40 | 80 | 40 | 30 | 80 | 40 | >400 |
| (B) amount (% wt A) + B)) | 40 | 40 | 40 | 40 | 30 | 40 | 40 | 40 | 40 |
| Post-cure mechanical properties | | | | | | | | | |
| Tensile strength (MPa) | 14.5 | 16.0 | 19.8 | 11.6 | 15 | 19.8 | 11.7 | n.d. | n.d. |
| M100 (MPa) | 5.2 | 6.8 | 4.5 | 4.5 | 5.7 | 5.2 | 5.9 | n.d. | n.d. |
| Elongation at break (%) | 340 | 260 | 290 | 351 | 290 | 264 | 330 | n.d. | n.d. |
| Hardness (Shore A) | 82 | 85 | 85 | 86 | 74 | 84 | 85 | n.d. | n.d. |
| Garvey test at 60 rpm | | | | | | | | | |
| edge | 10 | 5 | 10 | 10 | 10 | 6 | 10 | 3 | 8 |
| surface | A | B | A | B | A | A | B | C | C |
| Linear output cm/min | 115 | 90.7 | 120 | 108.3 | 101 | 86.7 | 107.4 | n.d. | n.d. |
| Die swell cm$^3$/cm$_{linear}$ | 0.46 | n.d. | 0.45 | 0.42 | 0.50 | 0.60 | 0.42 | n.d. | n.d. | n.d. = not determinable

The invention claimed is:

1. Vulcanizable fluoroelastomer compositions comprising:

A) a fluoroelastomer matrix based on vinylidene fluoride (VDF) with a Mooney viscosity (1+10) at 121° C. of less than 35 MU (Mooney Units) measured according to ASTM standard D 1646;

B) a semi-crystalline fluoropolymer, in an amount of from 20% to 70% by weight relative to the total weight of A)+B), the semi-crystalline fluoropolymer being chosen from tetrafluoroethylene (TFE) homopolymers and copolymers of TFE with one or more monomers containing at least one unsaturation of ethylenic type, in an amount of from 0.01 to 10 mol %, said semi-crystalline fluoropolymer having a mean particle size between 10 and 400 nm.

2. Vulcanizable fluoroelastomer compositions according to claim 1, in which the fluoroelastomers of the fluoroelastomer matrix A) are copolymers in which VDF is copolymerized with at least one comonomer selected from the group consisting of:

$C_2$-$C_8$ perfluoroolefins;

$C_2$-$C_8$ chloro- and/or bromo- and/or iodo-fluoroolefins;

(per)fluoroalkyl vinyl ethers (PAVE) $CF_2$=$CFOR_f$, in which $R_f$ is a $C_1$-$C_6$ (per)fluoroalkyl;

(per)fluorooxyalkyl vinyl ethers $CF_2$=$CFOX$, in which X is: a $C_1$-$C_{12}$ ((per)fluoro)oxyalkyl containing one or more ether groups;

(per)fluorodioxoles of formula:

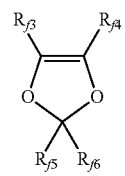

in which each of the groups $R_{f3}$, $R_{f4}$, $R_{f5}$ and $R_{f6}$, which are identical to or different from each other, is independently a fluorine atom or a $C_1$-$C_6$ perfluoroalkyl group optionally comprising one or more oxygen atoms;

(per)fluoromethoxyvinyl ethers (hereinbelow: MOVE) having the general formula:

$$CFX_2=CX_2OCF_2OR''_f$$ (I-Ba)

in which R"$_f$ is selected from the group consisting of linear or branched $C_1$-$C_6$ (per)fluoroalkyls; cyclic $C_5$-$C_6$ (per)fluoroalkyls; and linear or branched $C_2$-$C_6$ (per)fluorooxyalkyls, containing from one to three oxygen atoms, and $X_2$ =F or H;

non-fluorinated $C_2$-$C_8$ olefins (Ol).

3. Vulcanizable fluoroelastomer compositions according to claim 1, in which the fluoroelastomers A) have the following composition selected from the group consisting of compositions (a), (b), (c), (d) and (e), 100% being the sum of the molar percentages of the monomers:
  (a) vinylidene fluoride (VDF) 35-85%, hexafluoropropylene (HFP) 10-45%, tetrafluoroethylene (TFE) 0-30%, perfluoroalkyl vinyl ether (PAVE) 0-15%,
  (b) vinylidene fluoride (VDF) 50-80%, perfluoroalkyl vinyl ether (PAVE) 5-50%, tetrafluoroethylene (TFE) 0-30%;
  (c) vinylidene fluoride (VDF) 20-30%, non-fluorinated $C_2$-$C_8$ olefins (Ol) 10-30%, hexafluoropropylene (HFP) and/or perfluoroalkyl vinyl ether (PAVE) 18-27%, tetrafluoroethylene (TFE) 10-30%;
  (d) tetrafluoroethylene (TFE) 33-75%, perfluoroalkyl vinyl ether (PAVE) 15-45%, vinylidene fluoride (VDF) 5-30%, hexafluoropropylene (HFP) 0-30%, and
  (e) vinylidene fluoride (VDF) 35-85%, (per)fluoromethoxyvinyl ether (MOVE) 5-40%, perfluoroalkyl vinyl ether (PAVE) 0-30%, tetrafluoroethylene (TFE) 0-40%, hexafluoropropylene (HFP) 0-30%.

4. Vulcanizable fluoroelastomer compositions according to claim 1, in which the fluoroelastomer matrix also comprises monomer units derived from a bis-olefin having the general formula:

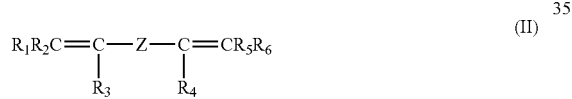
(II)

in which:
  $R_1$, $R_2$, $R_3$, $R_4$, $R_5$ and $R_6$, which are identical to or different from each other, are H or $C_1$-$C_5$ alkyls;
  Z is a linear or branched $C_1$-$C_{18}$ alkylene or cycloalkylene radical optionally containing oxygen atoms, or a (per)fluoropolyoxyalkylene radical.

5. Vulcanizable fluoroelastomer compositions according to claim 4, in which the amount of bis-olefin-based units is between 0.01 mol % and 1.0 mol % per 100 mol of the other monomer units constituting the base structure of the fluoroelastomer.

6. Vulcanizable fluoroelastomer compositions according to claim 1, in which the ethylenically unsaturated comonomers are of hydrogenated or fluorinated type.

7. Vulcanizable fluoroelastomer compositions according to claim 6, in which the hydrogenated comonomers are selected from the group consisting of: ethylene, propylene, acrylic monomers, and styrene monomers.

8. Vulcanizable fluoroelastomer compositions according to claim 6, in which the fluorinated comonomers are selected from the group consisting of:
  $C_2$-$C_8$ perfluoroolefins;
  $C_2$-$C_8$ chloro- and/or bromo- and/or iodo-fluoroolefins;
  (per)fluoroalkyl vinyl ethers (hereinbelow: PAVE) $CF_2$=$CFOR_f$, in which $R_f$ is a $C_1$-$C_6$ (per)fluoroalkyl;
  (per)fluorooxyalkyl vinyl ethers $CF_2$=CFOX, in which X is: a $C_1$-$C_{12}$ ((per)fluoro)oxyalkyl containing one or more ether groups;
  (per)fluorodioxoles of formula:

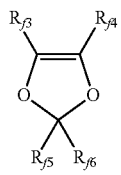

in which each of the groups $R_{f3}$, $R_{f4}$, $R_{f5}$ and $R_{f6}$, which are identical to or different from each other, is independently a fluorine atom or a $C_1$-$C_6$ perfluoroalkyl group optionally comprising one or more oxygen atoms;
  (per)fluoromethoxyvinyl ethers (hereinbelow: MOVE) having the general formula:

$$CFX_2=CX_2OCF_2OR"_f \qquad (I-Ba)$$

in which R"$_f$ is chosen from linear or branched $C_1$-$C_6$ (per)fluoroalkyls; cyclic $C_5$-$C_6$ (per)fluoroalkyls; and linear or branched $C_2$-$C_6$ (per)fluorooxyalkyls, containing from one to three oxygen atoms, and $X_2$=F or H;
  non-fluorinated $C_2$-$C_8$ olefins (Ol); and
  hydrogenated $C_2$-$C_8$ fluoroolefins and perfluoroalkylethylenes $CH_2$=CH—$R_f$, in which $R_f$ is a $C_1$-$C_6$ perfluoroalkyl.

9. Vulcanizable fluoroelastomer compositions according to claim 1, in which the semi-crystalline (per)fluoropolymer is covered with a shell of a semi-crystalline (per)fluoropolymer containing bromine and/or iodine atoms in the chain, derived from brominated and/or iodinated comonomers, in an amount of from 0.1 mol % to 10 mol % relative to the total number of moles of base monomer units in the core+shell semi-crystalline (per)fluoropolymer.

10. Vulcanizable fluoroelastomer compositions according to claim 1, comprising vulcanization coagents and vulcanization compound ingredients.

11. A method for producing extruded articles comprising extruding the vulcanizable fluoroelastomer compositions of claim 1.

12. Vulcanized products obtained by vulcanization of the compositions according to claim 1.

* * * * *